Figure 1:
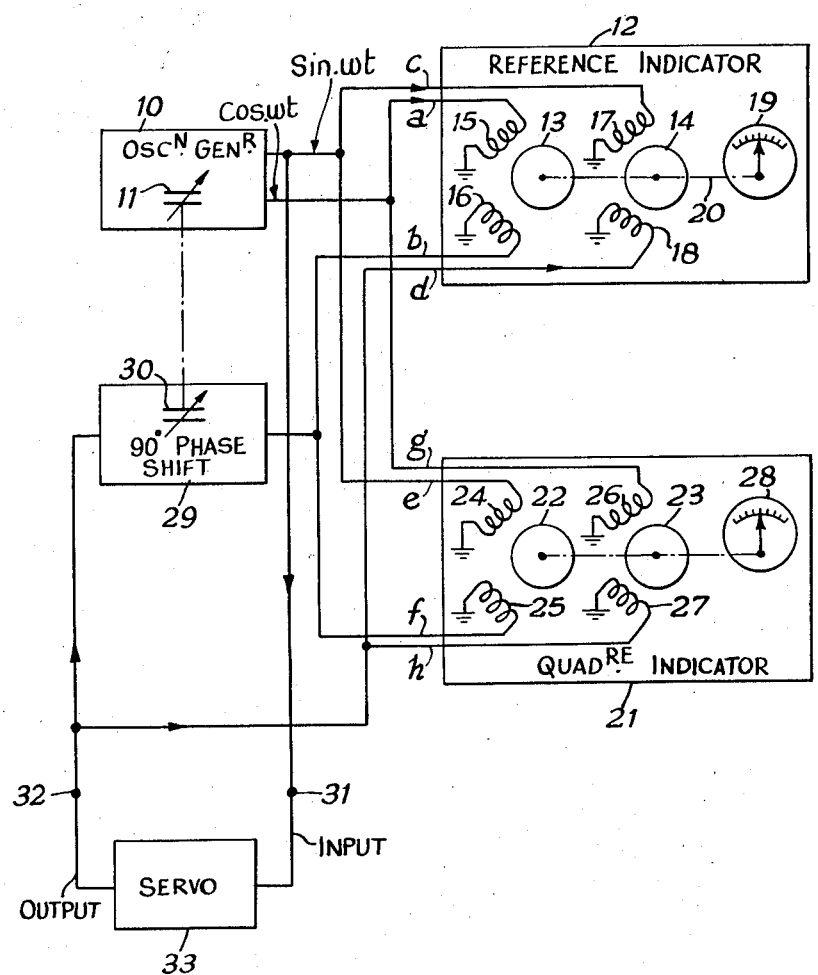

June 3, 1958  R. CATHERALL  2,837,718
TESTING SERVO SYSTEMS
Filed Jan. 10, 1957  2 Sheets-Sheet 1

INVENTOR
Reginald Catherall
BY
Ralph B. Stewart
ATTORNEY

United States Patent Office 2,837,718
Patented June 3, 1958

2,837,718

TESTING SERVO SYSTEMS

Reginald Catherall, Ashford, England, assignor to The Solartron Electronic Group Limited Application January 10, 1957, Serial No. 633,462

Claims priority, application Great Britain January 18, 1956

5 Claims. (Cl. 324—158)

The present invention relates to the testing of servo systems.

In the testing of servo systems, it is required to compare an input signal applied to a servo with an output signal derived from the servo and representing the response of the servo to the input signal. The servo may be of any kind, each as electro-mechanical or hydraulic for example, but the aforesaid signals, for the purpose of the present invention, are in each case electrical signals. Thus in the case of a hydraulic servo, transducers are used in order to derive the required electrical signals from hydraulic pressure changes.

For the purpose of the present specification and claims the term "servo" is intended to have a broad interpretation including any device which produces an effect, herein referred to as an output signal, in response to a stimulus, herein referred to as an input signal, and in which, in use, the said output signal is applied to control the operation of the device. The term is, therefore, intended to include not only simple servos but also a complete manufacturing process in which the output signal is derived from the end product of the process and is used to control one or more parameters of the process.

The testing referred to is usually carried out over a band of frequencies and equipment at present available is capable of dealing with a frequency range from about 0.1 to 1000 cycles per second. Below about 0.1 cycle per second accurate testing has not been practicable. The main reason for this is that known testing apparatus has required indicating circuits or devices having a time constant longer than the period of the lowest frequency at which testing is to be carried out and the provision of such time constants has not been practicable.

Requirements have, however, arisen for servos capable of responding at frequencies substantially below 0.1 cycle per second, for example in process control, or what is sometimes called "automation," and it is the principal object of this invention to provide a method of testing and testing apparatus capable of use with good accuracy at such low frequencies. In the case of a control of a manufacturing process, for example, such frequencies may correspond to time constants of the order of an hour.

According to the present invention there is provided a method of testing a servo comprising the steps of applying to the servo an input signal $\sin \omega t$ and thereby generating from the servo an output signal, multiplying $\sin \omega t$ by the said output signal to produce a first resultant, multiplying $\cos \omega t$ by the said output signal shifted in phase by 90° to produce a second resultant, adding the two resultants to produce an indication depending upon the component of the said output signal which is in phase with $\sin \omega t$, multiplying $\cos \omega t$ by the said output signal to produce a third resultant, multiplying $\sin \omega t$, by the said output signal shifted in phase by 90° to produce a fourth resultant, and adding the third and fourth resultants to produce an indication dependent upon the component of the said output signal which is in quadrature with respect to $\sin \omega t$.

In this way there can be produced indications which are free, or at least substantially free, from sinusoidal components, with the result that there is no need for indicating circuits or devices of long time constant.

The present invention also provides apparatus for testing servo systems comprising a source of electrical oscillations of angular frequency $\omega$ adapted to supply an input signal $\sin \omega t$ to a terminal for connection to the input of a servo to be tested and thereby to make an output signal of angular frequency $\omega$ available from the servo, a reference indicator, a quadrature indicator, each said indicator including two pairs of inputs, means for multiplying one input of each pair by the other to produce a resultant, means for adding the resultants, and means for indicating the result of the addition, phase-shifting means adapted to produce a phase-shift of 90° and having an input terminal for the application of said output signal from the servo and an output terminal connected to a first input of a first pair of inputs of the reference and quadrature indicators respectively, connections for applying oscillations $\sin \omega t$ from the source to a first input of the second pair of inputs of the reference indicator and to the second input of the first pair of inputs of the quadrature indicator, connections for applying oscillations $\cos \omega t$ from the source to the second input of the first pair of inputs of the reference indicator and to the first input of the second pair of inputs of the quadrature indicator, and a terminal whereby said output oscillation from the servo can be applied to the second input of the second pair of inputs of the reference and quadrature indicators, the arrangement being such that both indicators give indications substantially free from sinusoidal components.

The reference and quadrature indicators indicate respectively the magnitude and sense of the components of the output oscillation from the servo which are in phase (or anti-phase) and in quadrature with the input oscillation applied to the servo. The multiplying and adding means may take any convenient form. For instance, each indicator may comprise two wattmeters each of which has "voltage" and "current" input terminals constituting the aforesaid pair of inputs. The wattmeters are conveniently of the dynamometer type and the required addition may then be an addition of torque obtained by coupling the two wattmeter shafts in each indicator together, for instance by a direct coupling.

If preferred, however, wattmeters of other types may be used, such as thermo-couple wattmeters. In this case the addition is effected electrically.

The indicators may be visual indicators such as centre-zero indicators or they may be of another type such as recorders or means generating voltages dependent upon differences between the input and output oscillations of the servo and of use for applying corrections automatically.

The said source is preferably tunable over a range of frequencies and the phase-shifting means may then be ganged with the tuning means in such a manner that the desired phase shift of 90° is produced at all frequencies in the range.

Figure 2:
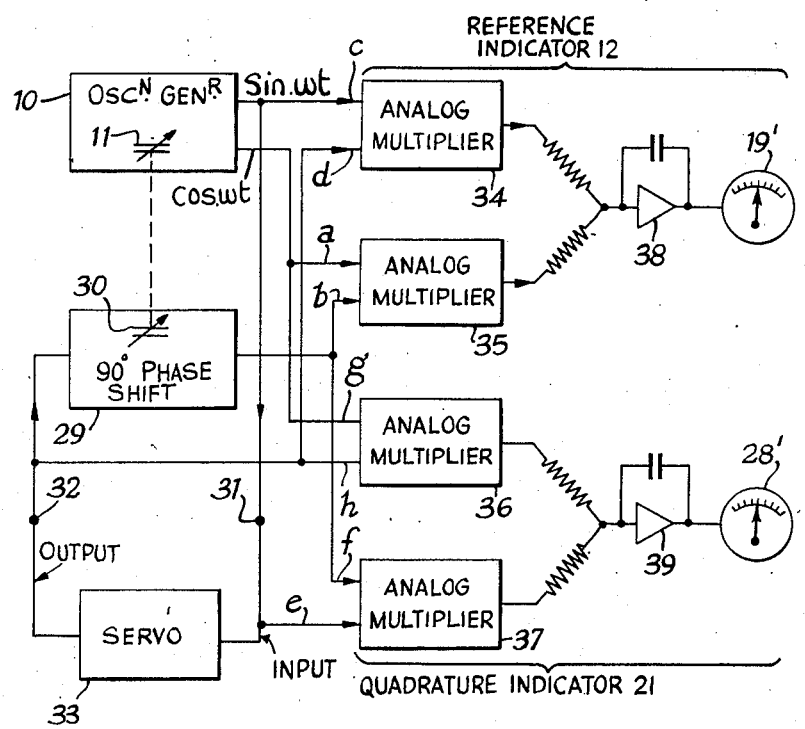

The invention will be described by way of example with reference to the accompanying drawings in which Figs. 1 and 2 are block circuit diagrams of two alternative embodiments of the invention.

Referring to Fig. 1, an oscillation generator 10 may be of the kind described in the specification of patent application Ser. No. 511,313, generating two outputs which can be expressed as $\sin \omega t$ and $\cos \omega t$ respectively, $\omega$, the angular frequency, being variable by tuning means represented diagrammatically by a tuning capacitor 11.

A reference indicator 12 has two pairs of input terminals $a, b$ and $c, d$ respectively and comprises two dynamometer-type wattmeters 13 and 14 having operating windings 15, 16, and 17, 18 respectively and having their shafts connected together and to a centre-indicating torque meter 19, as represented by the broken line 20.

A quadrature indicator 21, having two pairs of input terminals $e$, $f$ and $g$, $h$ respectively, is of like construction to the reference indicator and comprises wattmeters 22 and 23 having operating windings 24, 25 and 26, 27 respectively and a torque meter 28.

A phase-shift network 29 may be of the kind described in the aforementioned patent specification with reference to Fig. 8 of that specification and a tuning capacitor thereof is shown ganged to the tuning capacitor 11 of the oscillation generator 10, the arrangement being such that at all settings of the capacitor 11 within its operating range the network 29 produces a 90° phase shift in any signal applied thereto of the frequency of the oscillation generator 10.

Alternatively when very low-frequency oscillators are used, an effective capacity many times greater than that of the physical capacitor may be produced by known means, such as the so-called "Miller" integrator.

The test apparatus described has two external terminals 31 and 32 for connection respectively to the input and output of a servo 33 under test.

It will be seen from the drawing that the wattmeter 14 has $\sin \omega t$ applied through terminal $c$ to its winding 17 and the output of the servo applied directly through terminal $d$ to its winding 18. The wattmeter 13 has $\cos \omega t$ applied through terminal $a$ to its winding 15 and the output of the servo, phase-shifted by network 29 through 90°, applied through terminal $b$ to its winding 16. All the windings are, for convenience, shown with one terminal earthed.

Assuming that the servo 33 is operating ideally and that, therefore, its output corresponds exactly to its input and is $\sin \omega t$, the wattmeter 14 is driven by $\sin \omega t$ through both its windings 17 and 18, and, since the action of the wattmeter is to generate a torque proportional to the product of the two inputs, the torque is proportional to $\sin^2 \omega t$. The wattmeter 13 has $\cos \omega t$ applied to both its windings and, therefore, its torque is proportional to $\cos^2 \omega t$. The resultant torque to be applied to the meter 19 is, therefore, proportional to $\sin^2 \omega t + \cos^2 \omega t$ which is equal to unity. The torque is thus constant and has no sinusoidal component.

When the output of the servo 33 differs from the input thereto in phase or amplitude, the torque applied to the meter 19 is proportional to the magnitude of the component of the output which is in phase with $\sin \omega t$ and is also free from any sinusoidal component.

In a similar manner the torque applied to the meter 28 is proportional to the magnitude of the component of the output of the servo which is in quadrature with respect to $\sin \omega t$.

The invention is not restricted to the use of dynamometer-type wattmeters; other devices may be used whose electrical or mechanical output is proportional to the product of two electrical inputs. For example, electrical or electro-mechanical "four-quadrant analog multipliers" of any of the types described in "Electronic Analog Computers" by Korn and Korn, published by McGraw-Hill, first edition, chapter 6, may be used.

One embodiment of the invention employing multiplying devices of this kind in which the output is electrical is shown in Fig. 2, in which like parts have the same references as in Fig. 1. Each indicator comprises two such analog multipliers 34, 35 and 36, 37. In order to remove the disturbing effects of voltages arising in the servo system, the outputs of each pair of multipliers are preferably combined as shown in a summing and integrating D. C. amplifier 38, 39 of suitable fixed or variable time constant. Amplifiers described in chapter 5 of the publication referred to in the preceding paragraph are suitable. The indicating means 19' and 28' may be centre-zero ammeters or voltmeters.

I claim:

1. A method of testing a servo comprising the steps of applying to the servo an input signal $\sin \omega t$ and thereby generating from the servo an output signal, multiplying $\sin \omega t$ by the said output signal to produce a first resultant, multiplying $\cos \omega t$ by the said output signal shifted in phase by 90° to produce a second resultant, adding the two resultants to produce an indication dependent upon the component of the said output signal which is in phase with $\sin \omega t$, multiplying $\cos \omega t$ by the said output signal to produce a third resultant, multiplying $\sin \omega t$ by the said output signal shifted in phase by 90° to produce a fourth resultant, and adding the third and fourth resultants to produce an indication dependent upon the component of the said output signal which is in quadrature with respect to $\sin \omega t$.

2. Apparatus for testing servo systems comprising a source of electrical oscillations of angular frequency $\omega$ having a first terminal supplying a signal $\sin \omega t$ and a second terminal supplying a signal $\cos \omega t$, said first terminal serving for connection to the input of a servo to be tested, a servo output terminal for connection to the output of the servo, a reference indicator, a quadrature indicator, each said indicator including two pairs of inputs, means for multiplying one input of each pair by the other to produce a resultant, means for adding the resultants, and means for indicating the result of the addition, phase-shifting means producing a phase shift of 90° and having an input terminal, for connection to said servo output terminal, and an output terminal, means connecting the last-named output terminal to a first input of a first said pair of inputs of said reference and quadrature indicators respectively, means coupling said first source terminal to a first input of the second pair of inputs of said reference indicator and to the second input of the first pair of inputs of said quadrature indicator, means coupling said second source terminal to the second input of the first pair of inputs of said reference indicator and to the first input of the second pair of inputs of said quadrature indicator, and means coupling said servo output terminal to the second input of the second pair of inputs of said reference and quadrature indicators.

3. Apparatus according to claim 2, wherein the said multiplying means comprise means for generating a torque dependent upon the product of the input signals and wherein the adding means comprise means for adding the said torques.

4. Apparatus according to claim 2, wherein the said multiplying means comprise electrical or electro-mechanical four-quadrant analog multipliers.

5. Apparatus according to claim 2, wherein said phase-shifting means include a "Miller" integrator.

References Cited in the file of this patent

UNITED STATES PATENTS

| | | |
|---|---|---|
| 2,688,442 | Droz | Sept. 7, 1954 |
| 2,793,346 | Shrive | May 21, 1957 |